(12) United States Patent
Vachss

(10) Patent No.: US 7,599,408 B2
(45) Date of Patent: Oct. 6, 2009

(54) TUNABLE NARROW LINEWIDTH LASER SOURCE

(75) Inventor: Frederick R. Vachss, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 11/757,938

(22) Filed: Jun. 4, 2007

(65) Prior Publication Data

US 2008/0298403 A1 Dec. 4, 2008

(51) Int. Cl.
*H01S 3/10* (2006.01)
*H01S 3/14* (2006.01)

(52) U.S. Cl. .............. 372/20; 372/21; 372/22; 372/25; 372/68

(58) Field of Classification Search .......... 372/20, 372/25, 68, 21, 22
See application file for complete search history.

(56) References Cited

U.S. PATENT DOCUMENTS 6,229,828 B1   5/2001   Sanders et al.
7,388,709 B1 *  6/2008   Vachss et al. ............ 359/326

2006/0209912 A1   9/2006   Luo et al.

OTHER PUBLICATIONS

G. Cerullo, et al, "Ultrabroadband self-phase stabilized pulses by difference frequency generation", 2005 Conference on Lasers & Electo-Optics (CLEO), p. 948-950.

* cited by examiner

*Primary Examiner*—Armando Rodriguez
(74) *Attorney, Agent, or Firm*—Weiss & Moy, P.C.

(57) ABSTRACT

A tunable laser source has a first laser source to generate a low power continuous wave laser light having a wavelength $\lambda 1$. A second laser source generates a low power continuous wave laser light having a wavelength $\lambda 2$. A pump laser source generates a high power pulsed laser light having a wavelength $\lambda 0$. A first optical parametric amplifier (OPA) receives the laser light having a wavelength $\lambda 1$ and the laser light having a wavelength $\lambda 0$ and generates a high power pulsed laser light having a wavelength $\lambda 1$. A second optical parametric amplifier (OPA) receives the laser light having a wavelength $\lambda 2$ and the laser light having a wavelength $\lambda 0$ to and generates a high power pulsed laser light having a wavelength $\lambda 2$. A difference frequency generator (DFG), receives the high power pulsed laser light having a wavelength $\lambda 1$ and the high power pulsed laser light having a wavelength $\lambda 2$ and provides a high power pulsed laser light having a wavelength $\lambda 3$ wherein $\lambda 3 = \lambda 1 * \lambda 2 / (\lambda 2 - \lambda 1)$.

19 Claims, 1 Drawing Sheet

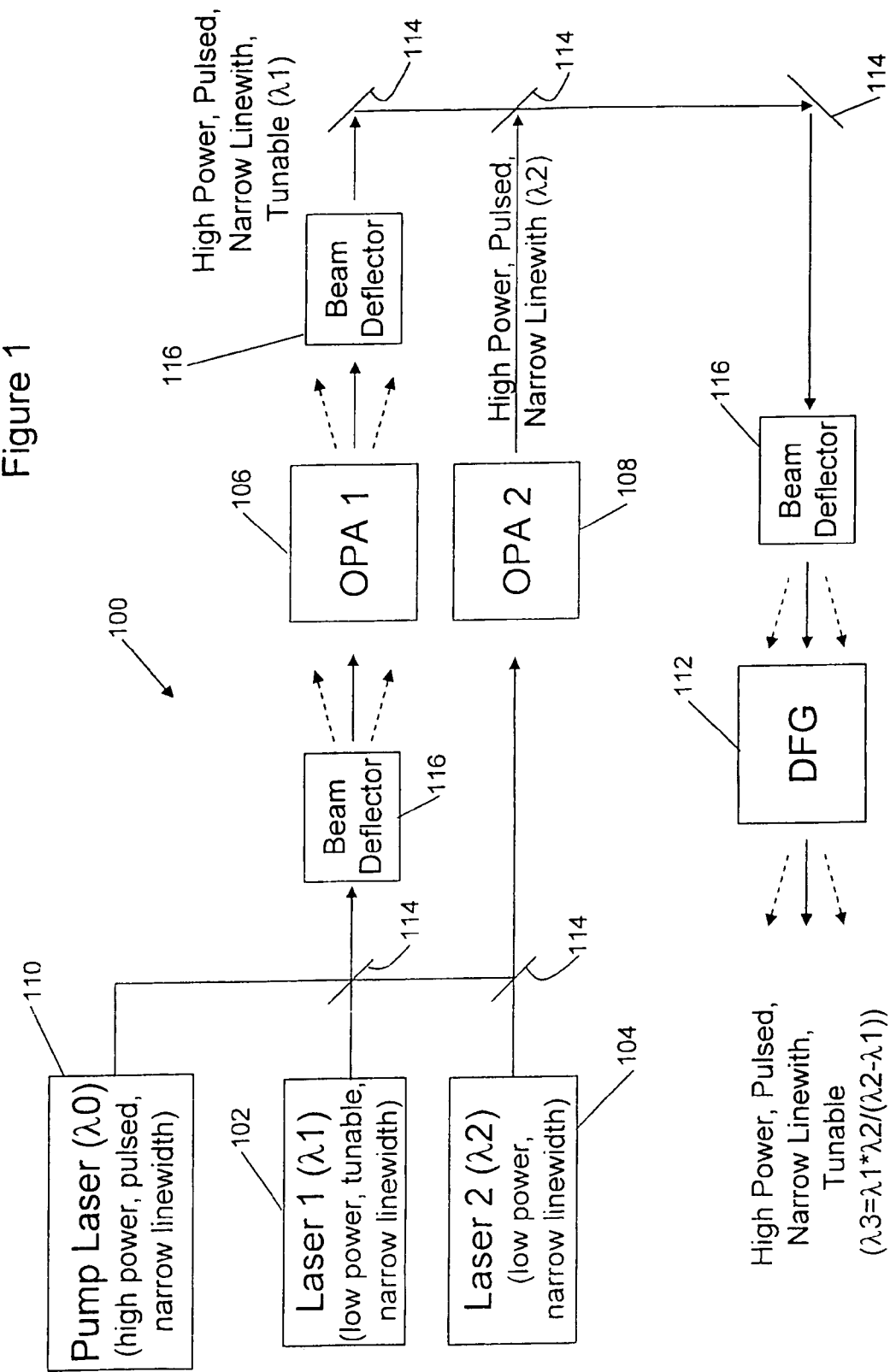

TUNABLE NARROW LINEWIDTH LASER SOURCE

BACKGROUND

Embodiments of this disclosure relate generally to laser sources, and more particularly, to an apparatus that converts tunable narrow-linewidth lasers that are low power and continuous wave into tunable high power pulsed laser required for nonlinear frequency conversion.

Spectroscopy is the study of the interaction between radiation (electromagnetic radiation, or light, as well as particle radiation) and matter. Spectroscopy is often used in physical and analytical chemistry for the identification of substances through the spectrum emitted from or absorbed by them.

In a Laser Induced Breakdown Spectroscopy (LIBS), a highly energetic laser pulse is used as an excitation source. LIBS can analyze any matter regardless of the state of the matter. Since all elements emit light when excited to sufficiently high temperatures, LIBS can detect all elements, limited only by the power of the laser as well as the sensitivity and wavelength range of the spectrograph & detector.

Recently, LIBS has been used to help identify hazardous compounds. However, for certain hazardous compounds, the spectroscopic signatures lie in spectral regions that do not correspond to existing laser sources. As a result nonlinear optical wavelength conversion is often employed to generate such laser sources. Such techniques, in particular the use of Optical Parametric Oscillators, produce a laser output that is spectrally broad and unsuited for highly selective spectral detection. While line narrowing techniques exist they typically impede the tuning of the laser.

Laser spectroscopic detection of hazardous substances requires a laser source that is not only tunable throughout the region of spectral interest, but also possessing a very narrow frequency linewidth within that spectral region. Laser sources available in the spectral regions corresponding to the spectroscopic signatures of most hazardous materials are limited in tunability or suffer from excessive linewidth. While tunable narrow-linewidth lasers that are low power and continuous wave are available, such tunable narrow-linewidth devices are not readily available in a high powered pulsed format.

Therefore, it would be desirable to provide an apparatus that overcomes the above problems. The apparatus would be able to generate a broadly tunable laser beam which would maintain a narrow linewidth throughout its tuning range.

SUMMARY

A tunable laser source has a first laser source to generate a low power continuous wave laser light having a wavelength $\lambda 1$. A second laser source generates a low power continuous wave laser light having a wavelength $\lambda 2$. A pump laser source generates a high power pulsed laser light having a wavelength $\lambda 0$. A first optical parametric amplifier (OPA) receives the laser light having the wavelength $\lambda 1$ and the laser light having the wavelength $\lambda 0$ and generates a high power pulsed laser light having the wavelength $\lambda 1$. A second optical parametric amplifier (OPA) receives the laser light having the wavelength $\lambda 2$ and the laser light having the wavelength $\lambda 0$ to and generates a high power pulsed laser light having the wavelength $\lambda 2$. A difference frequency generator (DFG) receives the high power pulsed laser light having a wavelength $\lambda 1$ and the high power pulsed laser light having the wavelength $\lambda 2$ and provides a high power pulsed laser light having a wavelength $\lambda 3$ wherein $\lambda 3 = \lambda 1 * \lambda 2 / (\lambda 2 - \lambda 1)$.

A method of generating a tunable laser source generates a low power continuous wave laser light having a wavelength $\lambda 1$ and a low power continuous wave laser light having a wavelength $\lambda 2$. A high power pulsed laser light is generated having a wavelength $\lambda 0$. The high power pulsed laser light having the wavelength $\lambda 0$ is combined with the laser light having a wavelength $\lambda 1$ to generate a high power pulsed laser light having a wavelength $\lambda 1$. The high power pulsed laser light having the wavelength $\lambda 0$ is also combined with the laser light having a wavelength $\lambda 2$ to generate a high power pulsed laser light having a wavelength $\lambda 2$. The high power pulsed laser light having a wavelength $\lambda 1$ and the high power pulsed laser light having a wavelength $\lambda 2$ are sent to a difference frequency generator (DFG) to generate a high power pulsed laser light having a wavelength $\lambda 3$ wherein $\lambda 3 = \lambda 1 * \lambda 2 / (\lambda 2 - \lambda 1)$.

A tunable laser source has a first laser source that generates a low power, tunable, continuous wave laser light having a wavelength $\lambda 1$. A second laser source generates a low power continuous wave laser light having a wavelength $\lambda 2$. A pump laser source generates a high power pulsed laser light having a wavelength $\lambda 0$. A first optical parametric amplifier (OPA) receives the laser light having the wavelength $\lambda 1$ and the laser light having the wavelength $\lambda 0$ and generates a high power pulsed laser light having the wavelength $\lambda 1$. A second optical parametric amplifier (OPA) receives the laser light having the wavelength $\lambda 2$ and the laser light having the wavelength $\lambda 0$ and generates a high power pulsed laser light having the wavelength $\lambda 2$. A difference frequency generator (DFG) receives the high power pulsed laser light having the wavelength $\lambda 1$ and the high power pulsed laser light having the wavelength $\lambda 2$ and provides a high power pulsed laser light having a wavelength $\lambda 3$ wherein $\lambda 3 = \lambda 1 * \lambda 2 / (\lambda 2 - \lambda 1)$. Beam deflectors are positioned in front and in rear of the first OPA, and in front of the DFG to enable optical phase matching over different operating wavelengths.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawing, wherein:

FIG. 1 is a simplified block diagram of an apparatus that converts tunable narrow-linewidth lasers that are low power and continuous wave into tunable high power pulsed laser required for nonlinear frequency conversion.

DETAILED DESCRIPTION

With reference now to the FIGURE, an apparatus 100 that generates a narrow linewidth laser light is shown. The apparatus 100 will generate a wide band tunable laser output in various portions of the spectrum in which no direct laser sources exist. The apparatus 100 intrinsically preserves the narrow linewidth behavior of the original source lasers, but translated into longer wavelength portions of the spectrum. More specifically, the apparatus 100 will convert tunable narrow-linewidth lasers that are low power and continuous wave into tunable high power pulsed laser required for nonlinear frequency conversion.

The apparatus 100 has a first laser source 102. The first laser source 102 will generate a low power tunable narrow linewidth laser light having a wavelength $\lambda 1$. A second laser source 104 is provided and generates a low power narrow linewidth laser light having a wavelength $\lambda 2$.

A pump laser source 110 provides a high power, pulsed narrow linewidth laser light at a wavelength $\lambda 0$. The laser light of the pump laser source 110 is at a shorter wavelength then that of the first laser source 102 and the second laser source 104. The pump laser source 110 is used to provide the energy for amplification of the laser light of the first laser source 102 and the second laser source 104.

Beam directors 114 are used to direct the laser light from the first laser source 102 and the laser light of the pump laser source 110 to an Optical Parametric Amplifier (OPA) 106 and the laser light from the second laser source 104 and the laser light of the pump laser source 110 to an OPA 108. The beam directors 114 are used to maintain a correct phase relationship between the laser light from the first laser source 102 and the laser light of the pump laser source 110 and the laser light from the second laser source 104 and the laser light of the pump laser source 110. The beam directors 114 are generally a reflecting mirror which may be adjusted to maintain the correct phase relationship laser lights.

The OPAs 106 and 108 are generally a cascaded set of nonlinear OPAs. The OPAs 106 and 108 serve to convert the low power laser lights $\lambda 1$ and $\lambda 2$ from the laser sources 102 and 104 to high peak power pulsed laser sources with the same wavelengths and spectral linewidth characteristics as the original low power inputs.

The pulsed outputs of the OPAs 106 and 108 are then sent to a Difference Frequency Generator (DFG) 112. One or more beam directors 114 may be used to direct the pulsed outputs of the OPAs 106 and 108 to the DFG 112. In the embodiment shown in FIG. 1, three beam directors 114 are used to direct the pulsed outputs from the OPAs 106 and 108 to the DFG 112. However, this is just one embodiment and should not be seen as to limit the scope. The beam directors 114 are again used to maintain a correct phase relationship between the pulsed outputs of the OPAs 106 and 108.

The DFG 112 is a type of parametric oscillator which generates a laser light output at a $3^{rd}$ wavelength $\lambda 3$ corresponding to the difference frequency between the laser light inputs of the first laser source 102 and the second laser source 104, with $\lambda 3 = \lambda 1 * \lambda 2 / (\lambda 2 - \lambda 1)$. The difference frequency relationship shows that if either of the input laser light sources is tunable, i.e., the first laser source 102 or the second laser source 104, then the output wavelength $\lambda 3$ is tunable as well.

A nonlinear optical crystal well configured as a DFG has the property that if two optical beams with wavelengths $\lambda 1$ and $\lambda 2$ are mixed in the material then a 3rd beam of wavelength $\lambda 3 = \lambda 1 * \lambda 2 / (\lambda 2 - \lambda 1)$ will be generated. In addition, energy will be transferred from the beam of wavelength $\lambda 1$ to the other two optical beams. The efficiency of this energy transfer is governed by the process of phase matching which can be controlled in a variety of ways in nonlinear optical materials, including: varying the orientation of the material with respect to the propagation and polarization directions of the light within, applying electrical voltage to the material and imposing periodic poling gratings on the domain structure of the material.

In order to achieve efficient operation of the apparatus 100 over a broad tuning range and at high output powers, it is necessary that nonlinear optical phase matching be preserved at all operating wavelengths. Thus, the phase matching conditions need to be altered as the first laser source 102 is tuned. This is achieved by using a device 116 for varying the angle of propagation of the laser lights through the nonlinear OPA material as a function of its wavelength. As a result, laser lights exiting the OPAs 106 and 108 will propagate at different angles as the apparatus 100 is tuned to different wavelengths. The laser lights from the OPAs 106 and 108 are then mixed in the DFG 112 for final conversion to the desired longer wavelength. Phase matching in this stage is also controlled by varying the angle of propagation of the laser lights through the DFG material by using the device 116.

The device 116 may be a rotating mirror commonly used in laser systems to direct a position of the laser light. Alternatively, the device 116 may be a series of mechanical or electro-optic beam deflectors as shown in FIG. 1. Beam deflectors are also commonly used in laser systems to control the output angle of a laser light. The listing of the different types of devices 116 are given as examples and should not be seen as to limit the scope. In the embodiment depicted in FIG. 1, beam deflectors are positioned at the input and output of the OPA 106. An additional beam deflector is positioned at the input of the DFG 112. The devices 116 allow additional control of the propagation angles of the laser lights. By this means, efficient conversion to a range of longer wavelengths can be achieved while maintaining narrow spectral linewidth and, if high tuning rate sources and high speed electro-optic beam deflectors are used, this tuning may be realized at similarly high rates. This will allow for faster detection of hazardous substances if the apparatus 100 is used in laser spectroscopic detection of hazardous substances.

The apparatus 100 creates, in the frequency range of interest in which no direct laser source exists, a laser source that is tunable within that frequency range and has high power. The apparatus 100 converts tunable narrow-linewidth lasers that are low power and continuous wave into tunable high power pulsed laser required for nonlinear frequency conversion. The apparatus 100 uses a combination of the generation of high peak power tunable narrow linewidth sources using Optical Parametric Amplifiers (OPAs) with the linewidth preserving wavelength conversion of a long wavelength DFG to generate a tunable high power pulsed laser.

In operation, the apparatus 100 will have the first laser source 102 generate a low power tunable narrow linewidth laser light having a wavelength $\lambda 1$. The second laser source 104 generates a low power narrow linewidth laser light having a wavelength $\lambda 2$. The pump laser source 110 provides a high power, pulsed narrow linewidth laser light at a wavelength $\lambda 0$ wherein the laser light of the pump laser source 110 is at a shorter wavelength then that of the first laser source 102 and the second laser source 104.

Beam directors 114 are used to direct the laser light generated from the first laser source 102 and the laser light of the pump laser source 110 to the OPA 106 and the laser light from the second laser source 104 and the laser light of the pump laser source 110 the OPA 108. The OPAs 106 and 108 convert the low power laser lights having the wavelength $\lambda 1$ and $\lambda 2$ from the laser sources 102 and 104 to high peak power pulsed laser sources with the same wavelengths and spectral linewidth characteristics as the original low power inputs.

The pulsed outputs of the OPAs 106 and 108 are then sent to the DFG 112. One or more beam directors 114 may be used to direct the pulsed outputs of the OPAs 106 and 108 to the DFG 112. The DFG 112 generates a laser light output at a $3^{rd}$ wavelength $\lambda 3$ corresponding to the difference frequency between the laser light inputs of the first laser source 102 and the second laser source 104, with $\lambda 3 = \lambda 1 * \lambda 2 / (\lambda 2 - \lambda 1)$. Thus, since the first laser source 102 is tunable, the output wavelength $\lambda 3$ is tunable as well.

As the first laser 102 is tuned, the phase matching conditions need to be altered. This is achieved by using devices 116 to varying the angle of propagation of the laser beams entering and exiting the nonlinear OPA material as a function of its wavelength.

While embodiments of the disclosure have been described in terms of various specific embodiments, those skilled in the art will recognize that the embodiments of the disclosure can be practiced with modifications within the spirit and scope of the claims.

What is claimed is:

1. A tunable laser source comprising:
   a first laser source to generate a low power continuous wave laser light having a wavelength $\lambda 1$;
   a second laser source to generate a low power continuous wave laser light having a wavelength $\lambda 2$;
   a pump laser source to generate a high power pulsed laser light having a wavelength $\lambda 0$;
   a first optical parametric amplifier (OPA), the first OPA receives the laser light having a wavelength $\lambda 1$ and the laser light having a wavelength $\lambda 0$ and generates a high power pulsed laser light having a wavelength $\lambda 1$;
   a second optical parametric amplifier (OPA), the second OPA receives the laser light having a wavelength $\lambda 2$ and the laser light having a wavelength $\lambda 0$ and generates a high power pulsed laser light having a wavelength $\lambda 2$; and
   a difference frequency generator (DFG), the OFO receives the high power pulsed laser light having a wavelength $\lambda 1$ and the high power pulsed laser light having a wavelength $\lambda 2$ and provides a high power pulsed laser light having a wavelength $\lambda 3$ wherein $\lambda 3 = \lambda 1 * \lambda 2 / (\lambda 2 - \lambda 1)$.

2. A tunable laser source in accordance with claim 1 further comprising laser light directors to adjust directions of the laser lights.

3. A tunable laser source in accordance with claim 1 further comprising beam deflectors to enable optical phase matching over different operating wavelengths.

4. A tunable laser source in accordance with claim 3 wherein the beam deflectors are positioned at an input and output of the first OPA and at an input of the DFG.

5. A tunable laser source in accordance with claim 1 wherein the first laser source is tunable.

6. A tunable laser source in accordance with claim 1 wherein the first laser source generates a low power, narrow linewidth continuous wave laser light having the wavelength $\lambda 1$.

7. A tunable laser source in accordance with claim 1 wherein the second laser source generates a low power, narrow linewidth continuous wave laser light having the wavelength $\lambda 2$.

8. A tunable laser source in accordance with claim 1 wherein the pump laser source generates a high power, pulsed, narrow linewidth laser light having the wavelength $\lambda 0$.

9. A method of generating a tunable laser source comprising:
   generating a low power continuous wave laser light having a wavelength $\lambda 1$ and a low power continuous wave laser light having a wavelength $\lambda 2$;
   generating a high power pulsed laser light having a wavelength $\lambda 0$;
   combining the laser light having a wavelength $\lambda 1$ and the laser light having a wavelength $\lambda 0$ to generate a high power pulsed laser light having a wavelength $\lambda 1$;
   combining the laser light having a wavelength $\lambda 2$ and the laser light having a wavelength $\lambda 0$ to generate a high power pulsed laser light having a wavelength $\lambda 2$;
   sending the high power pulsed laser light having a wavelength $\lambda 1$ and the high power pulsed laser light having a wavelength $\lambda 2$ to a difference frequency generator (DFG) to generate a high power pulsed laser light having a wavelength $\lambda 3$ wherein $\lambda 3 = \lambda 1 * \lambda 2 / (\lambda 2 - \lambda 1)$; and
   varying an angle of propagation of the laser lights to enabling optical phase matching over different operating wavelengths.

10. The method of claim 9 further comprising installing beam deflectors to adjust directions of the laser lights.

11. The method of claim 9 further comprising generating a low power, tunable, continuous wave laser light having a wavelength $\lambda 1$.

12. The method of claim 9 further comprising generating a low power, tunable, narrow linewidth continuous wave laser light wavelength $\lambda 1$.

13. The method of claim 9 further comprising generating a low power, narrow linewidth continuous wave laser light wavelength $\lambda 2$.

14. The method of claim 9 further comprising generating a high power, pulsed, narrow linewidth laser light having a wavelength $\lambda 0$.

15. A tunable laser source comprising:
   a first laser source to generate a low power tunable, continuous wave laser light having a wavelength $\lambda 1$;
   a second laser source to generate a low power continuous wave laser light having a wavelength $\lambda 2$;
   a pump laser source to generate a high power pulsed laser light having a wavelength $\lambda 0$;
   a first optical parametric amplifier (OPA), the first OPA receives the laser light having a wavelength $\lambda 1$ and the laser light having a wavelength $\lambda 0$ to and generates a high power pulsed laser light having a wavelength $\lambda 1$;
   a second optical parametric amplifier (OPA), the second OPA receives the laser light having a wavelength $\lambda 2$ and the laser light having a wavelength $\lambda 0$ to and generates a high power pulsed laser light having a wavelength $\lambda 2$;
   a difference frequency generator (DFG), the DFG receives the high power pulsed laser light having a wavelength $\lambda 1$ and the high power pulsed laser light having a wavelength $\lambda 2$ and provides a high power pulsed laser light having a wavelength $\lambda 3$ wherein $\lambda 3 = \lambda 1 * \lambda 2 / (\lambda 2 - \lambda 1)$; and
   beam deflectors positioned in front and in the rear of the first OPA, and in front of the DFG to enable optical phase matching over different operating wavelengths.

16. A tunable laser source in accordance with claim 15 further comprising a plurality of rotating mirrors to direct the laser lights.

17. A tunable laser source in accordance with claim 15 wherein the first laser source generates a tunable low power, narrow linewidth continuous wave laser light having the wavelength $\lambda 1$.

18. A tunable laser source in accordance with claim 15 wherein the second laser source generates a low power, narrow linewidth continuous wave laser light having the wavelength $\lambda 2$.

19. A tunable laser source in accordance with claim 15 wherein the pump laser source generates a high power, pulsed, narrow linewidth laser light having the wavelength $\lambda 0$.

* * * * *